(12) United States Patent
Chigurupati

(10) Patent No.: US 12,452,051 B2
(45) Date of Patent: Oct. 21, 2025

(54) SYSTEMS AND METHODS FOR HARDWARE SECURITY MODULE AND PHYSICAL SAFE INTEGRATION

(71) Applicant: Capital One Services, LLC, McLean, VA (US)

(72) Inventor: Srinivasa Chigurupati, Long Grove, IL (US)

(73) Assignee: CAPITAL ONE SERVICES, INC., McLean, VA (US)

( * ) Notice: Subject to any disclaimer, the term of this patent is extended or adjusted under 35 U.S.C. 154(b) by 407 days.

(21) Appl. No.: 18/096,783

(22) Filed: Jan. 13, 2023

(65) Prior Publication Data
US 2024/0243910 A1 Jul. 18, 2024

(51) Int. Cl.
*H04L 9/08* (2006.01)
*E05B 49/00* (2006.01)
*G07C 9/00* (2020.01)
*G07C 9/25* (2020.01)

(52) U.S. Cl.
CPC ............ *H04L 9/0877* (2013.01); *E05B 49/00* (2013.01); *G07C 9/00912* (2013.01); *G07C 9/25* (2020.01)

(58) Field of Classification Search
CPC ...... E05B 49/00; E05B 49/002; E05B 49/004; E05B 49/006; E05B 49/008; G07C 9/00; G07C 9/00896; G07C 9/00912; G07C 9/25; G07C 2009/0092
USPC .............................................................. 70/57
See application file for complete search history.

(56) References Cited

U.S. PATENT DOCUMENTS

| | | | | |
|---|---|---|---|---|
| 7,551,456 B2 * | 6/2009 | Behrens | ............... | H05K 7/1492 361/600 |
| 8,610,535 B2 * | 12/2013 | Hui | ........................ | E05B 13/002 709/219 |
| 9,545,029 B2 * | 1/2017 | Park | ....................... | H05K 5/0208 |
| 9,785,983 B2 * | 10/2017 | Zhao | ........................ | G06Q 30/04 |
| 10,657,754 B1 * | 5/2020 | Osborn | ............ | G06K 19/07749 |
| 11,512,520 B1 * | 11/2022 | Gray | ..................... | G08B 25/003 |
| 11,521,444 B1 * | 12/2022 | Badik | ................. | G07C 9/00912 |
| 2008/0245117 A1 * | 10/2008 | Victor | ................... | F41A 17/066 42/70.07 |
| 2018/0302477 A1 * | 10/2018 | Thul | ........................ | H04L 41/28 |
| 2019/0134786 A1 * | 5/2019 | Nguyen | ..................... | B25B 9/00 |
| 2020/0111095 A1 * | 4/2020 | Osborn | .............. | G06Q 20/4097 |
| 2021/0042400 A1 * | 2/2021 | Crawford | .................. | H05K 7/18 |

(Continued)

FOREIGN PATENT DOCUMENTS

WO   WO-2022027021 A1 *   2/2022   ........... E05B 1/0092

*Primary Examiner* — Nathan Cumar
(74) *Attorney, Agent, or Firm* — HUNTON ANDREWS KURTH LLP (57) ABSTRACT

Systems and methods for integrating a physical safe with one or more hardware security modules ("HSMs") on a server rack may include a server rack with a biometric locking front door, one or more HSMs mounted and physically locked to the server rack, and a rack-mounted safe. The safe may be configured to fit entirely within the server rack when the server rack front door is closed, include a biometric lock on the front door that only unlocks upon a biometric authentication from each of a key custodian A and a key custodian B, and include at least two internal compartments, each secured by a biometric lock, containing physical keys for the locks of the one or more HSMs.

20 Claims, 6 Drawing Sheets

(56) References Cited

U.S. PATENT DOCUMENTS

2021/0092872 A1* 3/2021 Iyengar ................ H05K 7/1401
2022/0191247 A1* 6/2022 Dhoble ................... H04L 63/20

* cited by examiner

SYSTEMS AND METHODS FOR HARDWARE SECURITY MODULE AND PHYSICAL SAFE INTEGRATION

FIELD OF THE DISCLOSURE

The present disclosure relates to systems and methods for integrating a physical safe in a server rack with hardware security modules to achieve enhanced physical security and reliability.

BACKGROUND

Compromise of sensitive information, such as customer personal information, maintained by companies is a recurring problem. Data breaches are usually the result of cyber-attacks through the internet or networks maintained by the companies targeted by these attacks. While focus has been on network-based attacks, physical security is just as important as cybersecurity. Sensitive information must be physically stored somewhere, often on servers in a server room or farm. If a bad actor could steal these physical servers, then he or she might be able to access the customer personal information without ever launching a cyber-attack. As a result, companies take steps to ensure the physical safety of hardware containing sensitive data such as customer personal information.

Traditionally, companies have physically secure servers and hardware containing sensitive information in server racks. This is often accomplished through one or more physical lock or locks. However, once the hardware is physically locked into a rack, the security issue is simply moved upstream one step to the question of how to secure the physical keys to the one or more physical locks. Historically, best practice has been to physically separate the keys from the locks to minimize the chance for physical security breach. This approach, however, has many potential drawbacks. For instance, the location of these keys must be tracked, but must not be common knowledge. If a key is lost, then maintenance of the physical hardware becomes impossible. In this scenario, new physical systems must be built and implemented if physical keys are lost. There is also an inconvenience factor when use of the keys is required due to the physical separation of the keys and the locked hardware. Keys may be stored in different areas or rooms of a server facility, or completely offsite. This makes use of the keys a challenge. Moreover, when a key owner is transporting a key from the storage location to the locked hardware, that key owner is at risk of attack.

These and other deficiencies exist. Accordingly, it would be advantageous to create a system of physical security that eliminates the risk and inconvenience created by physical separation of key and locked hardware while not incurring the normal risk created by physical proximity of the key(s) and locked hardware.

SUMMARY OF THE DISCLOSURE

Embodiments of the present disclosure provide a system for integrating a physical safe with one or more hardware security modules ("HSMs") on a server rack. The system may include a server rack including a first side equipment mounting rail, a second side equipment mounting rail, and a locking front door with a biometric lock, one or more HSMs mounted and physically locked to the first side equipment mounting rail through a first keyed lock and the second side equipment mounting rail through a second keyed lock, and a safe comprising: a first side equipment mounting rail and a second side equipment mounting rail, wherein the first side equipment mounting rail and the second side equipment mounting rail fit entirely within the server rack when the server rack front door is closed, a biometric lock on the front door configured to unlock responsive to a biometric authentication from each of a key custodian A and a key custodian B, and a plurality of internal compartments, comprising: a compartment A containing physical keys for the first side lock of the one or more HSMs secured by a biometric lock that unlocks responsive to biometric authentication by key custodian A and, a compartment B containing physical keys for the second side lock of the one or more HSMs secured by a biometric lock that only unlocks responsive to biometric authentication by key custodian B.

Embodiments of the present disclosure provide a method for using an integrated physical safe with one or more hardware security modules ("HSMs") on a server rack. The method may include receiving, at a biometric lock on the front door of a server rack, a biometric rack access attempt from one of a key custodian A and a key custodian B, authenticating the biometric rack access attempt by comparing the biometric rack access attempt with a digital biometric key for key custodian A and key custodian B, unlocking, as a result of the authentication, the biometric lock on the front door of the server rack to reveal one or more rack-mounted HSMs physically locked to the rack, and a rack mounted safe with a biometric lock on the front door, receiving, by the safe, biometric safe access attempts from each of the key custodian A and the key custodian B, authenticating the safe biometric access attempts of both the key custodian A and the key custodian B by comparing the biometric safe access attempt with the digital biometric key for key custodian A and key custodian B, unlocking, as a result of the safe authentication, the biometric lock on the front door of the safe to reveal at least two internal compartments, a compartment A and a compartment B, compartment A having a biometric lock and containing at least one physical key and compartment B having a biometric lock and containing at least one physical key, receiving, by the biometric lock of compartment A, a biometric compartment A access attempt by the key custodian A, authenticating the biometric compartment A access attempt by comparing the attempt with the digital biometric key for key custodian A and key custodian B, unlocking, as a result of the biometric compartment A authentication, the biometric lock on compartment A to provide access to the at least one physical key within compartment A, receiving, by the biometric lock of compartment B, a biometric compartment B access attempt by the key custodian B, authenticating the biometric compartment B access attempt by comparing the attempt with the digital biometric key for key custodian A and key custodian B, unlocking, as a result of the biometric compartment B authentication, the biometric lock on compartment B to provide access to the at least one physical key within compartment B; and unlocking with one of the at least one physical key from compartment A and one of the at least one physical key from compartment B, one of the one or more rack-mounted HSMs from the rack.

Embodiments of the present disclosure provide a method for using an integrated physical safe with one or more hardware security modules ("HSMs") on a server rack. The method may include receiving, at a biometric lock on the outer door of a safe mounted in a data center rack at a first location, a biometric authentication attempt from a key custodian, sending, as a result of the received biometric authentication attempt, a request for an encrypted biometric authentication key to a HSM mounted in the data center rack, receiving a communication failure with the HSM, sending, as a result of the communication failure with the HSM, a request, over a network, for the encrypted biometric key to a secondary HSM at a secondary location, receiving the encrypted biometric key from the secondary HSM, authenticating the biometric authentication attempt by comparing the biometric authentication attempt with the encrypted biometric key from the secondary HSM.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The present invention provides systems and methods for integrating a physical safe with one or more hardware security modules ("HSMs") on a server rack. The present invention may solve a number of issues with current best practices for physical security. HSMs containing sensitive information are usually locked to the server rack in which they are installed. The issue then becomes what to do with the physical keys for unlocking the HSMs. Historically, these keys were kept apart from the HSMs for added safety and due to logistical reasons, namely the size and weight of a safe is incompatible with server room floors and these safes are not of the size and design to integrate with server racks. Physical separation of the keys from the HSMs creates different logistical problems such as transportation risk, timing, access, etc. The present invention details a system that integrates a physical safe into a server rack with the HSMs, the physical safe being a repository for the HSM keys. The system overcomes the logistical barriers to keeping the keys in close proximity to the HSMs as well as maintaining robust physical security.

Figure 1:
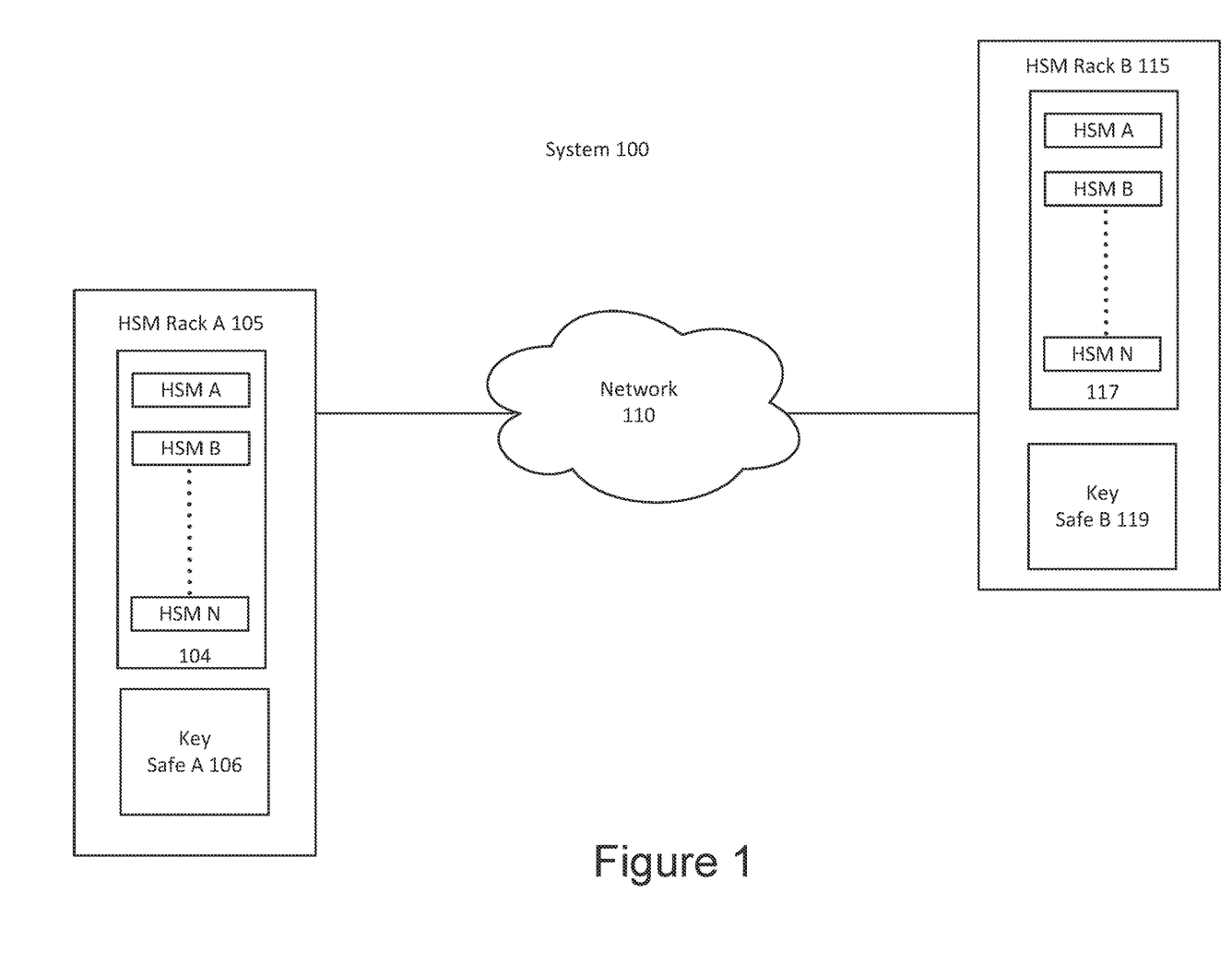
FIG. 1 illustrates a system for integrating a physical safe with a server rack containing hardware security modules according to an exemplary embodiment.

FIG. 1 illustrates a system for integrating a physical safe into a server rack with one or more hardware security modules. The system 100 may include hardware security module ("HSM") rack A 105, a network 110, and distant hardware security module ("HSM") rack B 115. Although FIG. 1 illustrates single instances of components of system 100, system 100 may include any number of components. For example, there may be any number of additional HSM racks interconnected via network 110.

System 100 may include HSM rack A 105. The HSM rack A 105 may include one or more HSMs 104, represented here by HSM A through HSM N as well as a physical key safe A 106. Key safe A 106 may be designed with dimensions to fit within, and be mounted to, HSM rack A 105. Furthermore, key safe A 106 may be of a weight to be compliant with the load capabilities of a server room floor. Key safe A 106 may be in digital communication with HSMs 104. Each HSM may be a server with a processors and memory. The HSMs 104 of HSM rack A 105 may be in data communication with any number of components of system 100. For example, the HSMs 104 of HSM rack A 105 may share and transmit data via network 110 to the HSM rack B via the HSMs 117 of HSM rack B. Without limitation, the HSM rack A 105 may be a network-enabled computer. As referred to herein, a network-enabled computer can include, without limitation, a computer device or communications device including, e.g., a server, a network appliance, a personal computer, a workstation, a phone, a handheld PC, a personal digital assistant, a smartcard (e.g. a contact-based card and a contactless card), a thin client, a fat client, an Internet browser, a kiosk, a tablet, a mobile device (e.g., a smartphone), a wearable device (e.g., a smart watch), a terminal, an automated teller machine (ATM), or other.

System 100 may also include HSM rack B 115. The HSM rack B 115 may include one or more HSMs 117, represented here by HSM A through HSM N as well as a physical key safe B 119. Key safe B 119 may be designed with dimensions to fit within, and be mounted to, HSM rack B 115. Furthermore, key safe B 119 may be of a weight to be compliant with the load capabilities of a server room floor. Key safe B 119 may be in digital communication with HSMs 117. Each HSM may be a server with a processors and memory. The HSMs 117 of HSM rack B 115 may be in data communication with any number of components of system 100. For example, the HSMs 117 of HSM rack B 115 may share and transmit data via network 110 to the HSM rack A 105 via the HSMs 104 of HSM rack A 105. Without limitation, the HSM rack B 115 may be a network-enabled computer. As referred to herein, a network-enabled computer can include, without limitation, a computer device or communications device including, e.g., a server, a network appliance, a personal computer, a workstation, a phone, a handheld PC, a personal digital assistant, a smartcard (e.g. a contact-based card and a contactless card), a thin client, a fat client, an Internet browser, a kiosk, a tablet, a mobile device (e.g., a smartphone), a wearable device (e.g., a smart watch), a terminal, an automated teller machine (ATM), or other.

The HSMs 104 of HSM rack A 105 may include processing circuitry and may contain additional components, including processors (e.g., one or more microprocessors), memories, error and parity/CRC checkers, data encoders, anticollision algorithms, controllers, command decoders, security primitives and tamper-proofing hardware, as necessary to perform the functions described herein. The HSMs 104 of HSM rack A 105 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

System 100 may include a network 110. In some examples, network 110 may be one or more of a wireless networks, a wired network or any combination of wireless network and wired network, and may be configured to connect to any one of the components of system 100. For example, the HSMs 104 of HSM rack A 105 may be configured to connect to the HSMs 117 of HSM rack B 115 via network 110. In some examples, network 110 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 110 may include, without limitation, telephone lines, fiber optics, IEEE Ethernet 902.3, a wide area network, a wireless personal area network, a LAN, or a global network such as the Internet. In addition, network 110 may support an Internet network, a wireless communication network, a cellular network, or the like, or any combination thereof. Network 110 may further include one network, or any number of the exemplary types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more examples, network 110 may comprise a plurality of interconnected networks, such as, for example, the Internet, a service provider's network, a cable television network, corporate networks, such as credit card association networks, and home networks.

System 100 may include HSM rack B 115 which may comprise one or more HSMs 117 and a physical key safe B 119 that may communicate with HSMs 117 and/or HSMs 104. The HSMs 104 and 117 may comprise servers. In some examples, the one or more servers may include one or more processors and one or more memory components. The server(s) may be configured as a central system, server or platform to control and call various data at different times to execute a plurality of workflow actions. In some examples, the server(s) can be a network-enabled computer.

In some examples, the server(s) can be a dedicated server computer, or any other rack-mounted device with a processor, memory, and network connection capable of supporting the system 100. While FIG. 1 illustrates two server racks, it is understood that other embodiments can use any number of servers/server racks or multiple computer systems as necessary or desired to support the architecture for backup and redundancy to prevent network downtime in the event of a failure of a particular server.

The server may include processing circuitry and may contain additional components, including processors, memories, error and parity/CRC checkers, data encoders, anticollision algorithms, controllers, command decoders, security primitives and tamper-proofing hardware, as necessary to perform the functions described herein. The server may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

The HSMs 104 and 117 of system 100 may include one or more databases. The databases may comprise relational databases, a non-relational databases, or other database implementations, and any combination thereof, including a plurality of relational databases and non-relational databases. In some examples, the databases may comprise a desktop database, a mobile database, or an in-memory database. In some examples, the databases may be in data communication with any number of components of system 100.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory and/or database of the HSMs 104 and 117.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Figure 2:
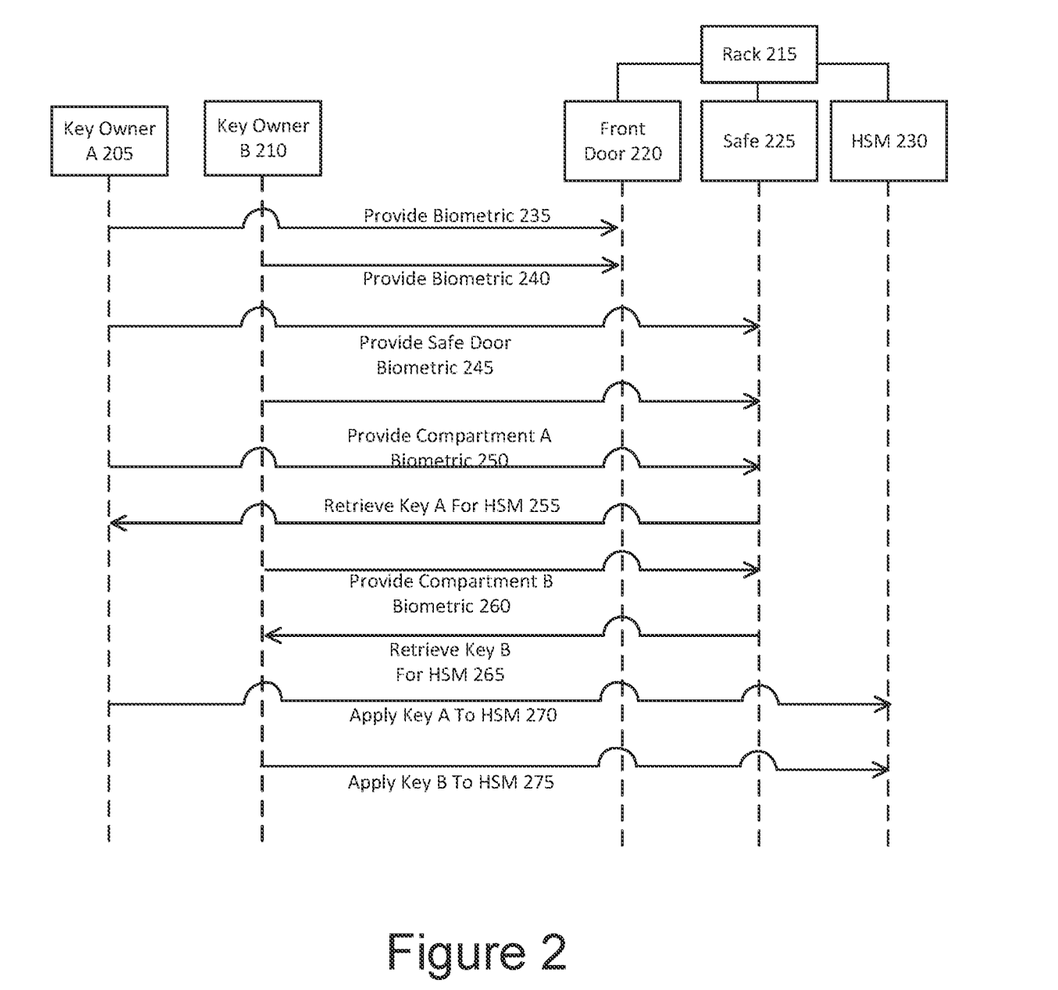
FIG. 2 illustrates a sequence of operations for using a physical safe integrated with a server rack containing hardware security modules according to an exemplary embodiment.

The sequence diagram of FIG. 2 illustrates an exemplary application of embodiments of the invention in conjunction with the system 100 of FIG. 1. In the exemplary embodiment set forth in FIG. 2, the goal is to remove a HSM 230 from a server rack 215. In this embodiment, HSM 230 may have two distinct locks, one for locking the HSM 230 to the left rail of the server rack 215 and one for locking the HSM 230 to the right rail of the server rack 215. These two rails may be considered a first and a second rail. Each lock may require a separate key to unlock. As a result, there may be a key custodian for each of the two keys, represented here by key owner A 205 and key owner B 210. Server rack 215 may not only house the HSM 230, but also a rack-mounted safe 225. Server rack 215 may also include a front door 220 with biometric lock.

At step 235, key owner A 205 may attempt to open to open the front door 220 of server rack 215. This may include key owner A 205 providing a biometric identifier to the biometric lock of front door 220. This may be considered an access or unlock attempt. The biometric identifier may be any immutable characteristic for key owner A 205. These biometric identifiers may include fingerprints, handprints, vein prints, retinal scans, iris scans, voice prints, facial recognition, etc. The biometric lock of front door 220 may attempt to authenticate the biometric identifier offered by key owner A 205. In some instances, the biometric lock of front door 220 may require a fixed and specified biometric identifier. In other embodiments, the biometric lock of front door 220 may be programmed to receive any of a number of different biometric identifiers. In some embodiments, more than one biometric identifier may be required to authenticate key owner A 205. In yet another embodiment, the biometric lock of front door 220 may be programmed to request a secondary biometric identifier if the lock is unable to authenticate a primary identifier. The biometric lock of front door 220 may authenticate the biometric identifier of key owner A 205 by comparing the biometric identifier with a saved biometric for key owner A 205. The saved biometric for key owner A 205 may have been collected during lock configuration and may be a trusted biometric key for comparison with any access attempts. The trusted biometric key may include any number of trusted biometrics and may be stored in memory within the biometric lock. The trusted key may be stored externally if the biometric lock is able to communicate with other devices. The lock may be capable of communicating via Bluetooth®, NFC, wireless, and wired connections. Upon verifying that the biometric identifier offered by key owner A 205 matches the trusted biometric key, the biometric lock may unlock, thereby allowing key owner A 205 to open the front door 220 of the server rack 215 to reveal HSM 230 and safe 225.

Similarly, at step 240, key owner B 210 may also attempt to open to open the front door 220 of server rack 215. This may include key owner B 210 providing a biometric identifier to the biometric lock of front door 220. This may be considered an access or unlock attempt. The biometric identifier may be any immutable characteristic for key owner B 210. These biometric identifiers may include fingerprints, handprints, vein prints, retinal scans, iris scans, voice prints, facial recognition, etc. The biometric lock of front door 220 may attempt to authenticate the biometric identifier offered by key owner B 210. In some instances, the biometric lock of front door 220 may require a fixed and specified biometric identifier. In other embodiments, the biometric lock of front door 220 may be programmed to receive any of a number of different biometric identifiers. In some embodiments, more than one biometric identifier may be required to authenticate key owner B 210. In yet another embodiment, the biometric lock of front door 220 may be programmed to request a secondary biometric identifier if the lock is unable to authenticate a primary identifier. The biometric lock of front door 220 may authenticate the biometric identifier of key owner B 210 by comparing the biometric identifier with a saved biometric for key owner B 210. The saved biometric for key owner B 210 may have been collected during lock configuration and may be a trusted biometric key for comparison with any access attempts. The trusted biometric key may include any number of trusted biometrics and may be stored in memory within the biometric lock. The trusted key may be stored externally if the biometric lock is able to communicate with other devices. The lock may be capable of communicating via Bluetooth®, NFC, wireless, and wired connections. Upon verifying that the biometric identifier offered by key owner B 210 matches the trusted biometric key, the biometric lock may unlock, thereby allowing key owner B 210 to open the front door 220 of the server rack 215 to reveal HSM 230 and safe 225. In embodiments of the invention, the front door 220 biometric lock may be unlocked upon biometric authentication of either key owner A 205 or key owner B 210. In other embodiments, the biometric lock may require authentication by both key owner A 205 and key owner B 210 prior to unlocking. The biometric lock may not require a certain order of authentication. The biometric lock may require authentication attempts from both key owner A and key owner B within a predefined amount of time. The predefined amount of time may initiate at the first authentication attempt of either key owner A or key owner B. The biometric lock may allow for specification of who is making an authentication attempt prior to the attempt. This may reduce the processing required to compare with a trusted biometric key. The biometric lock on front door 220 may be programmed to also grant access to additional users as needed or desired.

Once the front door 220 is opened, key owner A 205 and key owner B 210 may attempt to open safe 225. The safe 225 may include a biometric lock on the outer safe door. This biometric lock may be the same or similar to the biometric lock on server rack front door 220. This biometric lock may also be entirely distinct depending on security requirements. For example, utilizing different biometric locks may improve security by reducing the risk of hacking the biometric locks. The locks also may be different if they require different functionalities. For instance, if the lock on the server rack front door 220 does not require dual authentication, then it may not be the same lock as that used on the outer door of safe 225.

At step 245, key owner A 205 and key owner B 210 may each provide one or more biometric identifiers to the biometric lock of the safe 225. In some embodiments, the biometric lock may require key owner A 205 and key owner B 210 to provide biometric identifiers within a predefined timeframe. For instance, the biometric lock may require access attempts by key owner A 205 and key owner B 210 within a minute of each other, or some other defined time. This avoids the scenario where both key owners are not present at the same time when attempting to access the safe 225. The biometric lock on the outer door of the safe 225 may require a preset number of biometric identifiers. In other embodiments, the number of required biometric identifiers may be randomly generated by the lock. In other embodiments, the type of biometric identifiers may be fixed, and in other embodiments, the type(s) may be randomly chosen by the lock. The lock may require a certain order of biometric identifiers. In a simplistic example, the lock may only require a single biometric identifier which may be specified, such as a fingerprint. Other rules may be implemented for authentication.

The biometric lock on the outer door of the safe 225 may attempt to authenticate key owner A 205 and key owner B 210. The authentication process may include comparing the biometric identifiers provided by key owner A 205 and key owner B 210 to one or more digital keys. The digital keys may include trusted biometric identifiers for key owner A 205 and key owner B 210. The trusted identifiers may be collected upon setup of the biometric lock on the outside door for safe 225. These digital keys may be stored locally within the biometric lock, or be stored remotely. If the biometric lock on the outer door of safe 225 can confirm that the provided biometric identifiers match the digital key(s), the biometric lock may unlock. In some embodiments, the biometric lock may be able to confirm one or the other key owner, but not both. In this instance, the biometric lock may require the unauthenticated key owner to resubmit the same biometric identifier for a second attempt at authentication. The biometric lock may also require both key owners to resubmit biometric identifiers. In yet another embodiment, the biometric lock may only require both key owners to resubmit biometric identifiers is there a defined period of time has elapsed. In some embodiments, instead of requiring one or both users to resubmit the same biometric identifier, the biometric lock may request a different biometric identifier from the unauthenticated key owner, or both key owners. The biometric lock may then try a second attempt at authenticating the unauthenticated key owner, or both key owners, by once again comparing the provided biometric indicator to the digital key(s).

Upon successful authentication of key owner A 205 and key owner B 210, the safe may unlock and the outside safe door may be opened. Inside the safe 225, there may be two or more internal compartments. The first compartment, compartment A, may store one or more keys belonging to key owner A 205. Each of these one or more keys may fit one lock on each of one or more HSMs on rack 215. For example, each key within compartment A may fit a lock on the left side of the face of each HSM on rack 215. Similarly, the second compartment, compartment B, may store one or more keys belonging to key owner B 210. Each of these one or more keys may fit one lock on each of one or more HSMs on rack 215. For example, each key within compartment B may fit a lock on the right side of the face of each HSM on rack 215. In the specific example set forth in FIG. 2, compartment A may hold a physical key that fits a lock on the left side of the face of HSM 230 and compartment B may hold a physical key that fits a lock on the right side of the face of HSM 230. Compartment A and compartment B may each be secured by a biometric lock that is independent from the biometric lock on the outer door of safe 225. Compartment A may only be unlocked by key owner A 205 and compartment B may only be unlocked by key owner B 210.

At step 250, key owner A 205 may provide one or more biometric indicators to the biometric lock of compartment A. Authentication and unlocking of the biometric lock of compartment A may be similar to the description provided with respect to the biometric lock on the rack front door 220, explained above. Once the provided biometric indicator(s) are authenticated, compartment A may become accessible to key owner A 205. At step 255, key owner A may retrieve key A from unlocked compartment A.

At step 260, key owner B 210 may provide one or more biometric indicators to the biometric lock of compartment B. Authentication and unlocking of the biometric lock of compartment B may be similar to the description provided with respect to the biometric lock on the rack front door 220, explained above. Once the provided biometric indicator(s) are authenticated, compartment B may become accessible to key owner B 210. At step 265, key owner B may retrieve key B from unlocked compartment B.

At step 270, key owner A 205 may apply key A to the left-side lock of HSM 230. This may include inserting the key into the lock and turning the key to an unlock position. At step 275, key owner B 210 may apply key B to the right-side lock of HSM 230. This may include inserting the key into the lock and turning the key to an unlock position. Once both locks on HSM 230 have been unlocked, HSM may be removed from rack 215.

Figure 3:
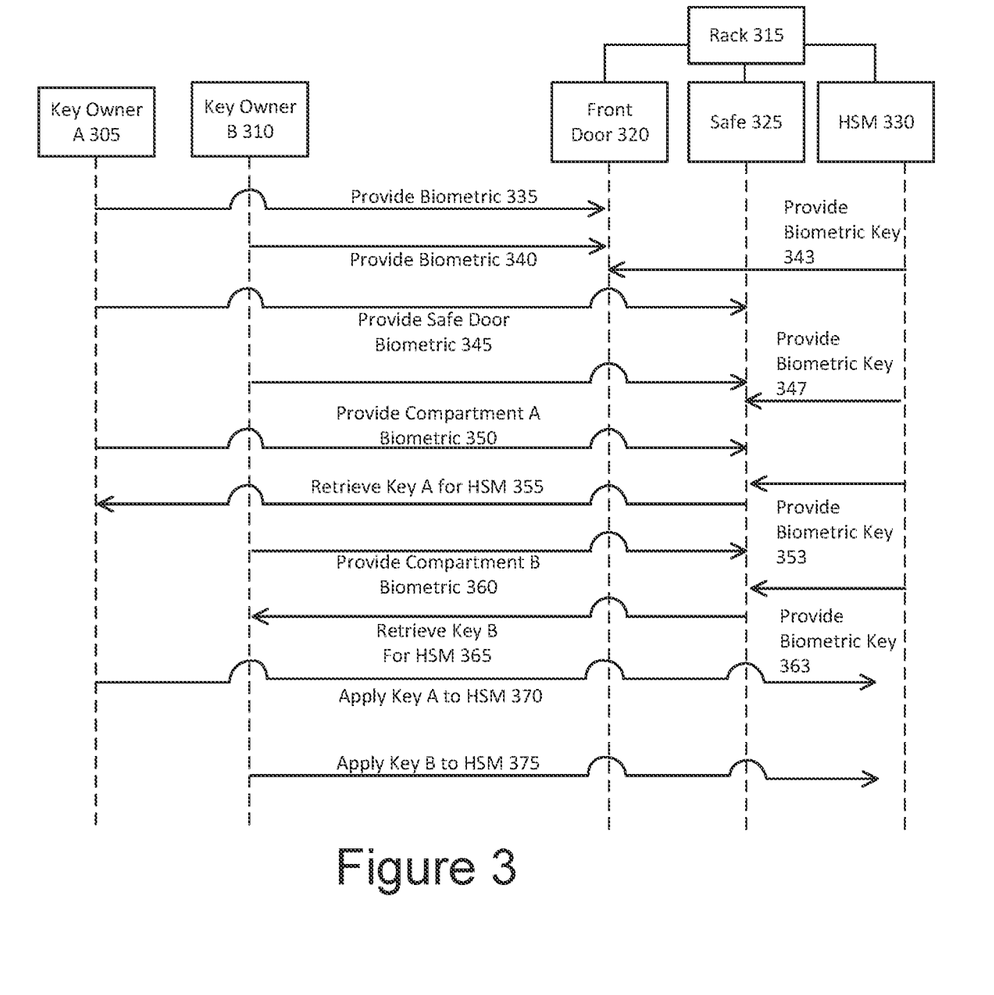
FIG. 3 illustrates a sequence of operations for using a physical safe integrated with a server rack containing hardware security modules according to an exemplary embodiment.

In some embodiments, it may be desirable to create an architecture whereby the digital biometrics key(s) are stored on the HSM(s) for greater security and utility. The sequence diagram of FIG. 3 illustrates an exemplary embodiment in which the digital biometrics key(s) are stored in HSM 330. In the embodiment set forth in FIG. 3 the goal is the same as in FIG. 2, to remove a HSM 330 from a server rack 315. In this embodiment, HSM 330 may have two distinct locks, one for locking the HSM 330 to the left rail of the server rack 315 and one for locking the HSM 330 to the right rail of the server rack 315. Each lock may require a separate key to unlock. As a result, there may be a key custodian for each of the two keys, represented here by key owner A 305 and key owner B 310. Server rack 315 may not only house the HSM 330, but also a rack-mounted safe 325. Server rack 315 may also include a front door 320 with biometric lock.

At step 335, key owner A 305 may attempt to open to open the front door 320 of server rack 315. This may include key owner A 305 providing a biometric identifier to the biometric lock of front door 320. This may be considered an access or unlock attempt. The biometric identifier may be any immutable characteristic for key owner A 305. These biometric identifiers may include fingerprints, handprints, vein prints, retinal scans, iris scans, voice prints, facial recognition, etc. The biometric lock of front door 320 may attempt to authenticate the biometric identifier offered by key owner A 305. In some instances, the biometric lock of front door 320 may require a specific fixed biometric identifier. In other embodiments, the biometric lock of front door 320 may be programmed to receive any of a number of different biometric identifiers.

In some embodiments, more than one biometric identifier may be required to authenticate key owner A 305. In yet another embodiment, the biometric lock of front door 320 may be programmed to request a secondary biometric identifier if the lock is unable to authenticate a primary identifier. The biometric lock of front door 320 may authenticate the biometric identifier of key owner A 305 by comparing the biometric identifier with a saved biometric for key owner A 305. The saved biometric for key owner A 305 may have been collected during lock configuration and may be a trusted biometric key for comparison with any access attempts. The trusted biometric key may include any number of trusted biometrics. This trusted biometric key may be stored in HSM 330 and shared with the biometric lock of front door 320. In order for HSM 330 to be capable of sharing the trusted biometric key with the biometric lock of the front door 320, there must be some manner of communication between HSM 330 and the biometric lock of the front door 320. In some embodiments, the communication link may be a direct hardwired connection between the rack 315 (i.e. the biometric lock of front door 320) and the HSM 330. This approach may make the rack system more self-contained and less vulnerable to attempted cyber-attacks. In other embodiments, the communication link may be a network communication, e.g., WIFI, ethernet, etc. There may also be communication via other means such as Bluetooth®, NFC, etc. There may be a synergy created by using the HSM 330 to store the trusted biometric key(s) that are used to grant access to physical keys that ultimately are used to remove and service HSM 330. Additionally, HSM 330 is well suited to store and manage the trusted biometrics keys because the purpose of the HSM 330 is to store and manage access to sensitive information. Also, there may be increased utility from utilizing HSM 330 for storing and managing the trusted biometric key(s). For example, updated files may be uploaded to the trusted biometric key(s) with new and/or different key owner's or different biometrics for existing key owners.

Because the trusted biometric key(s) are stored on HSM 330, and HSM 330 is network connected, there needs to be some form of security applied to the trusted biometric key(s). The trusted biometric key(s) may be encrypted symmetrically or asymmetrically. In the case of symmetrically encrypted biometric key(s), HSM 330 may provide an encryption key to the biometric lock of front door 320. This encryption key may be stored in memory of the biometric lock. The encryption key may be changed periodically, and HSM 330 may push the new encryption key to the biometric lock of front door 320. The pushing of a new encryption key may force the biometric lock to overwrite the existing encryption key. In the event of asymmetric encryption, the process may be similar, except HSM 330 may pass a private decryption key to the biometric lock of front door 320 that functions against a public encryption key, as opposed to the single key structure of the symmetric encryption approach.

Regardless of the encryption type, at step 343, HSM 330 may pass an encrypted version of the biometric key(s) to the biometric lock of front door 320. The biometric lock of front door 320 may then decrypt the encrypted biometric key using the decryption key supplied by HSM 330 and stored locally in the biometric lock's memory. Upon decrypting the biometric key, a comparison may be made against the biometric identifier(s) provided by key owner A 305. Upon verifying that the biometric identifier offered by key owner A 305 matches the trusted biometric key, the biometric lock may unlock, thereby allowing key owner A 305 to open the front door 320 of the server rack 315 to reveal HSM 330 and safe 325.

Similarly, at step 340, key owner B 310 may also attempt to open to open the front door 320 of server rack 315. This may include key owner B 310 providing a biometric identifier to the biometric lock of front door 320. This may be considered an access or unlock attempt. The biometric identifier may be any immutable characteristic for key owner B 310. These biometric identifiers may include fingerprints, handprints, vein prints, retinal scans, iris scans, voice prints, facial recognition, etc. The biometric lock of front door 320 may attempt to authenticate the biometric identifier offered by key owner B 310. In some instances, the biometric lock of front door 320 may require a specified fixed biometric identifier. In other embodiments, the biometric lock of front door 320 may be programmed to receive any of a number of different biometric identifiers. In some embodiments, more than one biometric identifier may be required to authenticate key owner B 310. In yet another embodiment, the biometric lock of front door 320 may be programmed to request a secondary biometric identifier if the lock is unable to authenticate a primary identifier. The biometric lock of front door 320 may authenticate the biometric identifier of key owner B 310 by comparing the biometric identifier with a saved biometric for key owner B 310. The saved biometric for key owner B 310 may have been collected during lock configuration and may be a trusted biometric key for comparison with any access attempts. The trusted biometric key may include any number of trusted biometrics. As discussed, the trusted biometric key(s) may be stored in and managed by HSM 330. Further, HSM 330 may encrypt the trusted biometric key(s) prior to sending to the biometric lock of front door 320.

At step 343, HSM 330 may pass an encrypted version of the biometric key(s) to the biometric lock of front door 320. The biometric lock of front door 320 may then decrypt the encrypted biometric key using the decryption key supplied by HSM 330 and stored locally in the biometric lock's memory. Upon decrypting the biometric key, a comparison may be made against the biometric identifier(s) provided by key owner B 310. Upon verifying that the biometric identifier offered by key owner B 310 matches the trusted biometric key, the biometric lock may unlock, thereby allowing key owner B 310 to open the front door 320 of the server rack 315 to reveal HSM 330 and safe 325. In embodiments of the invention, the front door 320 biometric lock may be unlocked upon biometric authentication of either key owner A 305 or key owner B 310. In other embodiments, the biometric lock may require authentication by both key owner A 305 and key owner B 310 prior to unlocking. The biometric lock may not require a certain order of authentication. The biometric lock may allow for specification of who is making an authentication attempt prior to the attempt. This may reduce the processing required to compare with a trusted biometric key. The biometric lock on front door 320 may be programmed to also grant access to additional users as needed or desired.

Once the front door 320 is opened, key owner A 305 and key owner B 310 may attempt to open safe 325. The safe 325 may include a biometric lock on the outer safe door. This biometric lock may be the same or similar to the biometric lock on server rack front door 320. This biometric lock may also be entirely distinct depending on security requirements. For example, utilizing different biometric locks may improve security by reducing the risk of hacking the biometric locks. The locks also may be different if they require different functionalities. For instance, if the lock on the server rack front door 320 does not require dual authentication, then it may not be the same lock as that used on the outer door of safe 325.

At step 345, key owner A 305 and key owner B 310 may each provide one or more biometric identifiers to the biometric lock of the safe 325. In some embodiments, the biometric lock may require key owner A 305 and key owner B 310 to provide biometric identifiers within a specified time of each other. For instance, the biometric lock may require access attempts by key owner A 305 and key owner B 310 within a minute of each other, or some other defined time. This avoids the scenario where both key owners are not present at the same time when attempting to access the safe 325. The biometric lock on the outer door of the safe 325 may require a preset number of biometric identifiers. In other embodiments, the number of required biometric identifiers may be randomly generated by the lock. In other embodiments, the type of biometric identifiers may be fixed, and in other embodiments, the type(s) may be randomly chosen by the lock. The lock may require a certain order of biometric identifiers. In a simplistic example, the lock may only require a single biometric identifier which may be specified, such as a fingerprint. Other rules may be implemented for authentication.

As discussed with regards to the biometric lock on front door 320, the biometric key(s) may be stored in HSM 330. In this embodiment, HSM 330 may encrypt the biometric key(s) prior to sending to the biometric lock on the outer door of the safe 325. The biometric lock on the outer door of the safe 325 may store a 2-way (symmetrical) or a 1-way (asymmetrical) decryption key, provided by HSM 330. Decryption key(s) may also be manually loaded onto the biometric lock.

At step 347, HSM 330 may send the encrypted biometric key(s) to the biometric lock on the outer door of the safe 325, which may, in turn, use the stored decryption key(s) to decrypt the biometric key(s). After decryption, the biometric lock on the outer door of the safe 325 may attempt to authenticate key owner A 305 and key owner B 310. The authentication process may include comparing the biometric identifiers provided by key owner A 305 and key owner B 310 to one or more digital keys. The digital keys may include trusted biometric identifiers for key owner A 305 and key owner B 310. The trusted identifiers may be collected upon setup of the biometric lock on the outside door for safe 325. These digital keys may be stored locally within the biometric lock, or be stored remotely. If the biometric lock on the outer door of safe 325 can confirm that the provided biometric identifiers match the digital key(s), the biometric lock may unlock. In some embodiments, the biometric lock may be able to confirm one or the other key owner, but not both. In this instance, the biometric lock may require the unauthenticated key owner to resubmit the same biometric identifier for a second attempt at authentication. The biometric lock may also require both key owners to resubmit biometric identifiers. In yet another embodiment, the biometric lock may only require both key owners to resubmit biometric identifiers is there a defined period of time has elapsed. In some embodiments, instead of requiring one or both users to resubmit the same biometric identifier, the biometric lock may request a different biometric identifier from the unauthenticated key owner, or both key owners. The biometric lock may then try a second attempt at authenticating the unauthenticated key owner, or both key owners, by once again comparing the provided biometric indicator to the digital key(s).

Upon successful authentication of key owner A 305 and key owner B 310, the safe may unlock and the outside safe door may be opened. Inside the safe 325, there may be two or more internal compartments. The first compartment, compartment A, may store one or more keys belonging to key owner A 305. Each of these one or more keys may fit one lock on each of one or more HSMs on rack 315. For example, each key within compartment A may fit a lock on the left side of the face of each HSM on rack 315. Similarly, the second compartment, compartment B, may store one or more keys belonging to key owner B 310. Each of these one or more keys may fit one lock on each of one or more HSMs on rack 315. For example, each key within compartment B may fit a lock on the right side of the face of each HSM on rack 315. In the specific example set forth in FIG. 3, compartment A may hold a physical key that fits a lock on the left side of the face of HSM 330 and compartment B may hold a physical key that fits a lock on the right side of the face of HSM 330. Compartment A and compartment B may each be secured by a biometric lock that is independent from the biometric lock on the outer door of safe 325. Compartment A may only be unlocked by key owner A 305 and compartment B may only be unlocked by key owner B 310.

At step 350, key owner A 305 may provide one or more biometric indicators to the biometric lock of compartment A. At step 353, HSM 330 may provide an encrypted biometric key to the biometric lock of compartment A. This process may be similar to that discussed with respect to the biometric lock on front door 320 and the biometric lock on the outer door of safe 325. Authentication and unlocking of the biometric lock of compartment A may be similar to the description provided with respect to the biometric lock on the rack front door 320, explained above. Once the provided biometric indicator(s) are authenticated, compartment A may become accessible to key owner A 305. At step 355, key owner A may retrieve key A from unlocked compartment A.

At step 360, key owner B 310 may provide one or more biometric indicators to the biometric lock of compartment B. At step 363, HSM 330 may provide an encrypted biometric key to the biometric lock of compartment B. This process may be similar to that discussed with respect to the biometric lock on front door 320 and the biometric lock on the outer door of safe 325. Authentication and unlocking of the biometric lock of compartment B may be similar to the description provided with respect to the biometric lock on the rack front door 320, explained above. Once the provided biometric indicator(s) are authenticated, compartment B may become accessible to key owner B 310. At step 365, key owner B may retrieve key B from unlocked compartment B.

In some embodiments, the biometric locks of the front door 320, outer door of the safe 325, compartment A, and compartment B may all utilize the same type of encryption and/or the same encryption/decryption keys. In other embodiments, there may be different encryption methods used for the various biometric locks, or different keys for one or more of the biometric locks for added layers of security. In some embodiments, not all of the biometric locks are connected to HSM 330. For example, in one embodiment, the biometric lock on front door 320 may be self-contained, while the biometric locks of the safe 225 may be connected to HSM 330. Other combinations may be possible.

At step 370, key owner A 305 may apply key A to the left-side lock of HSM 330. This may include inserting the key into the lock and turning the key to an unlock position. At step 375, key owner B 210 may apply key B to the right-side lock of HSM 230. This may include inserting the key into the lock and turning the key to an unlock position. Once both locks on HSM 330 have been unlocked, HSM 330 may be removed from rack 315.

In the case where the trusted biometric key is stored on the HSM 330 and some or all of the biometric locks are communicatively coupled with the HSM 330, there is a potential system failure issue. Specifically, if HSM 330 fails it will need to be replaced from rack 315, and in order to remove HSM 330 from rack 315, it must be physically unlocked by key owner A 305 and key owner B 310. However, the keys are stored in safe 325 and that safe cannot be opened without biometric authentication. Biometric authentication cannot occur without the trusted biometric key(s) which are stored on HSM 330, which in this embodiment, has failed. Thus, there could exist a situation where there is no way to access the physical keys required to remove the failed HSM 330 from rack 315. The same potential issue exists for the other biometric locks as well. Turning back to FIG. 1, a solution to the potential issue is provided. HSM rack A 105 may be communicatively coupled, via network 110, with one or more additional HSM racks, depicted here by HSM rack B 115. The HSMs 117 on the additional HSM rack B 115 may be redundant to the HSMs 104 of HSM rack A 105. Alternatively, HSMs 117 may include more data, less data, different data, etc. that HSMs 104. Regardless, HSMs 117 may include a copy of the trusted biometric key(s) of the HSMs 104. In the event that an HSM from HSMs 104 might fail and not be able to provide a trusted biometric key to the biometric locks of the rack door, outer safe door, or safe compartments for biometric authentication, the key may be supplied from the HSMs 117 of HSM rack B 115. In this way, the system has built in failover redundancy to ensure uninterrupted operation. In embodiments, HSM rack A 105 may also store trusted biometric key(s) for HSM rack B 115, thereby providing two-way failover redundancy. This HSM rack architecture may be scalable and utilize any number of HSM racks, each storing trusted biometric key(s) for the other HSM racks. These HSM racks may be located distant from each other, anywhere in the world.

Figure 4:
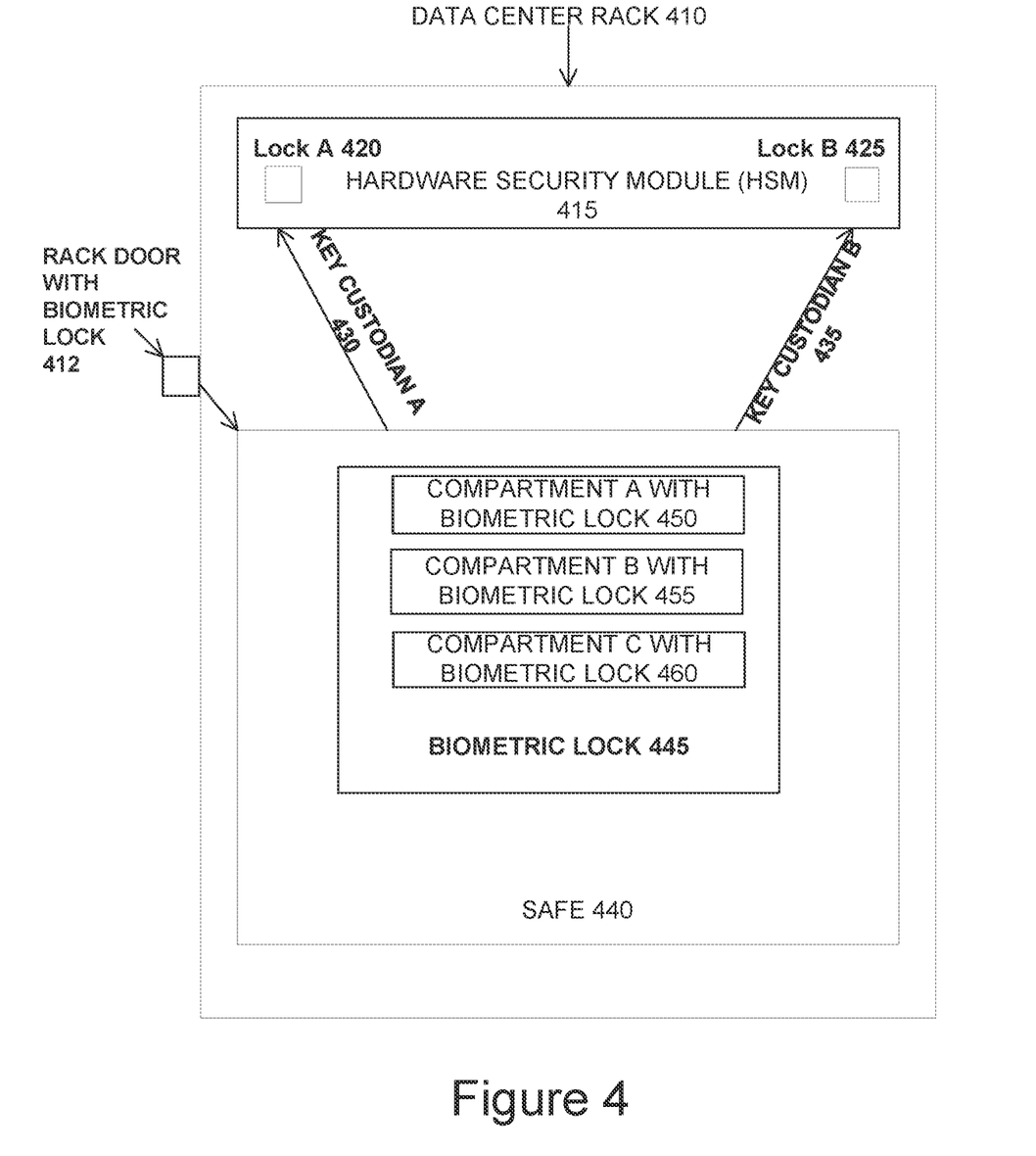
FIG. 4 is a schematic representation of a server rack with an integrated safe according to an exemplary embodiment.

With reference to FIG. 4, a data center rack 410 may include a rack-mounted hardware security module ("HSM") 415 as well as a rack-mounted safe 440. In some embodiments, more than one HSM may be mounted in data center rack 410. The safe 440 may be designed to minimize weight in order to make rack-mounting possible, but still maintain security. The safe 440 may also be designed to fit entirely within a standard size data center rack 410 with a height to comply with the standardized rack sizing. For example, the height of the safe 440 may be some multiple of rack units (e.g., 5U, 6U, etc.). Moreover, the safe 440 may be designed with mounting ears that comply with standardized rack mounting geometry. The safe may also be designed to fit partially within the data center rack. For example, the data center rack may have an open back face and the safe 440 may extend outside of the data center rack dimensions. The safe 440 may be mounted relatively low on the data center rack 410 (e.g., the bottom), in order to maximize physical stability since the safe 440 is likely to still weigh relatively more than the one or more HSMs mounted in data center rack 410. The data center rack 410 may include two mounting rails (not pictured). The orientation of FIG. 4 is of a user facing data center rack 410, and given this orientation, one mounting rail may be on the left side of the data center rack 410 and one mounting rail may be on the right side of the data center rack 410. Both the HSM 415 and safe 440 may be mounted to the rack via the left side and right side mounting rails using standardized rack mounting geometry. Moreover, HSM 415 may be locked to the left side mounting rail through lock A 420 and the right side mounting rail through lock B 425. Lock A 420 and lock B 425 may both be physical keyed locks.

The physical key for lock A 420 may be stored in compartment A 450 of safe 440. The physical key for lock B 425 may be stored in compartment B 455 of safe 440. Compartment A 450 and compartment B 455 may be locked and secured with individual biometric locks. The biometric lock of compartment A 450 may be single authentication and may only be opened by biometric authentication from key custodian A 430, and the biometric lock of compartment B 455 may be single authentication and may only be opened by biometric authentication from key custodian B 435. In some embodiments, there may be one or more backup custodian for compartment A 450 and for compartment B 455. However, it may be that no one person has biometric access to both compartment A 450 and compartment B 455. Safe 440 may include one or more additional compartments, illustrated here by compartment C 460. Each compartment may have its own biometric lock.

Data center rack 410 may be fully enclosed with a biometrically locking front door 412. The biometric lock of biometrically locking front door 412 may require single or dual biometric authentication. The single or dual biometric authentication may be provided by key custodian A 430 and/or key custodian B 435. In some embodiments there may be additional users who may authenticate biometrically to unlock biometrically locking front door 412. For instance, there may be an administrator or one or more backup users with access permissions. Authenticating biometrics to the biometric lock of biometrically locking front door 412 may result in the front door unlocking and allowing user access to the front faces of HSM 415 and safe 440. The front face of safe 440 may include an outer safe door with biometric lock 445. Biometric lock 445 may require dual authentication from key custodian A 430 and key custodian B 435. The biometric lock 445 may require authentication in a specific order, and may further prompt biometric input from a specific key custodian. Alternatively, biometric lock 445 may be capable of verifying the identity of key custodian A 430 and key custodian B 435 in either order without prompting a custodian for biometric input. The biometric lock 445 may include any number of additional rules and/or security measures. For instance, the lock may require both key custodians to use the same type of biometric input, may require multiple biometric inputs from one or both key custodian, may require input of biometrics from both custodians within a defined time frame, etc. Dual authentication to biometric lock 445 may result in unlocking the outer safe door and allowing access to the compartments inside the safe. As discussed, the safe may include at least two compartments, but more compartments are possible. Compartment A 450 may include the physical key for lock A 420 and compartment B 455 may include the physical key for lock B 425. In some embodiments, there may be multiple HSMs, each with left side and right side locks. Compartment A 450 may be the repository for all left side locks for all of the HSMs, and compartment B 455 may be the repository for all right side locks for all of the HSMs. In this embodiment, key custodian A 430 would be the key custodian for each left side lock of each HSM on data center rack 410. Similarly, key custodian B 435 would be the key custodian for each right side lock of each HSM on data center rack 410. Each of the compartments inside safe 440 may be locked and secured by a biometric lock requiring single authentication from a specific user. For example, compartment A 450 may require biometric authentication from key custodian A 430 and may not be opened by key custodian B 435. The opposite may be true for compartment B 455. As discussed, in some embodiments, there may be backup users authorized to access one of the compartments, however a single user may not have biometric access to both compartment A 450 and compartment B 455. Upon biometric authentication at the biometric lock of compartment A 450, key custodian A 430 may have access to the physical key for lock A 420, and upon biometric authentication at the biometric lock of compartment B 455, key custodian B 435 may have access to the physical key for lock B 425.

Figure 5:
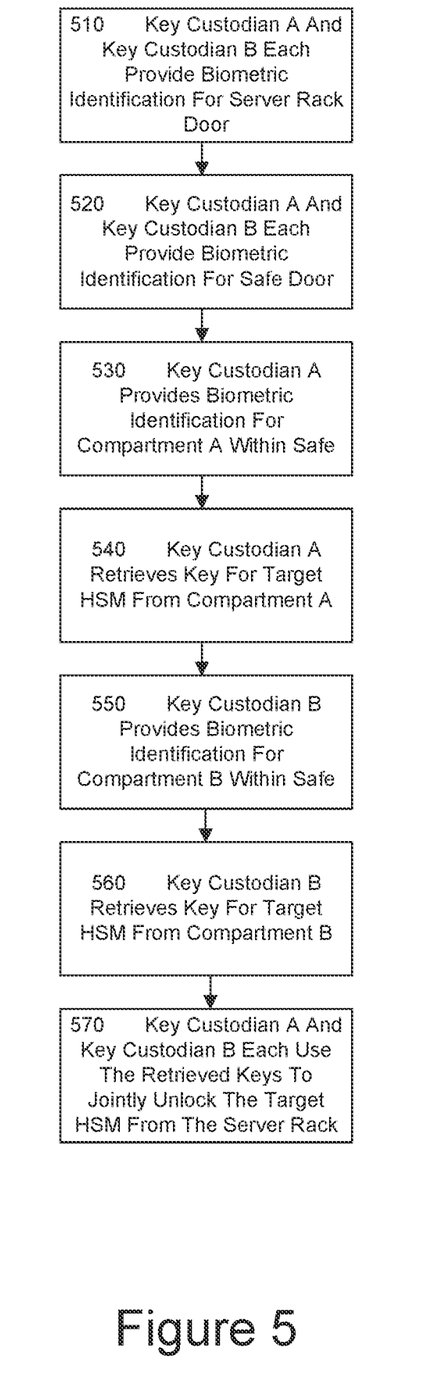
FIG. 5 is a flow diagram illustrating a method of using a physical safe integrated with a server rack containing hardware security modules according to an exemplary embodiment.

FIG. 5 illustrates an exemplary method for using a server rack with integrated physical safe and one or more hardware security modules according to an embodiment of the invention. The actions of the method depicted in FIG. 5 may be carried out by two key custodians and may result in retrieving, from a safe, physical keys to unlock a HSM from a data center rack. Key custodians may approach the data center rack and find the rack to be enclosed with the front door locked with a biometric lock.

At step 510, the key custodian A and key custodian B provide biometric identification for the biometric lock on the data center rack door. In other embodiments, the biometric lock on the rack door may only require biometric identification from one of the two key custodians. In yet another embodiment, the biometric lock on the rack door may also be unlocked by additional users, such as an administrator or backup key custodians. The biometric identification may be any immutable characteristic for key custodian A and key custodian B. These biometric identifiers may include fingerprints, handprints, vein prints, retinal scans, iris scans, voice prints, facial recognition, etc. The biometric lock of the server rack door may attempt to authenticate the biometric identifier offered by either key owner. In some instances, the biometric lock of the server rack door may require a specific fixed biometric identifier. In other embodiments, the biometric lock may be programmed to receive any of a number of different biometric identifiers. In some embodiments, more than one biometric identifier may be required to authenticate one of the key owners. In yet another embodiment, the biometric lock may be programmed to request a secondary biometric identifier if the lock is unable to authenticate a primary identifier. The biometric lock of the server rack door may authenticate the provided biometric identifier by comparing the biometric identifier with saved biometrics for the approved users. The saved biometrics may have been collected during lock configuration and may comprise a trusted biometric key for comparison with any access attempts. The trusted biometric key may include any number of trusted biometrics.

This trusted biometric key may be stored in a HSM mounted to the data center rack, and shared with the biometric lock of front door 320. In order for the HSM to be capable of sharing the trusted biometric key with the biometric lock of the front server rack door, there must be some manner of communication between the HSM and the biometric lock of the front server door. In some embodiments, the communication link may be a direct hardwired connection between the server rack (i.e. the biometric lock of front server door) and the HSM. This approach may make the rack system more self-contained and less vulnerable to attempted cyber-attacks. In other embodiments, the communication link may be a network communication, e.g., WIFI, ethernet, etc. There may also be communication via other means such as Bluetooth®, NFC, etc. There may be a synergy created by using the HSM to store the trusted biometric key(s) that are used to grant access to physical keys that ultimately are used to remove and service HSM. Additionally, the HSM is well suited to store and manage the trusted biometrics keys because the purpose of the HSM is to store and manage access to sensitive information. Also, there may be increased utility from utilizing the HSM for storing and managing the trusted biometric key(s). For example, updated files may be uploaded to the trusted biometric key(s) with new and/or different key owner's or different biometrics for existing key owners.

Because the trusted biometric key(s) are stored in the HSM, and the HSM is network connected, there needs to be some form of security applied to the trusted biometric key(s). The trusted biometric key(s) may be encrypted symmetrically or asymmetrically. In the case of symmetrically encrypted biometric key(s), the HSM may provide an encryption key to the biometric lock of front server door. This encryption key may be stored in a memory of the biometric lock. The encryption key may be changed periodically, and the HSM may push the new encryption key to the biometric lock of the front server door. The pushing of a new encryption key may force the biometric lock to overwrite the existing encryption key. In the event of asymmetric encryption, the process may be similar, except the HSM may pass a private decryption key to the biometric lock of the front server door that functions against a public encryption key, as opposed to the single key structure of the symmetric encryption approach. Regardless of the encryption type the HSM may pass an encrypted version of the biometric key(s) to the biometric lock of the front server door. The biometric lock of the front server door may then decrypt the encrypted biometric key using the decryption key supplied by the HSM and stored locally in the biometric lock's memory. Upon decrypting the biometric key, a comparison may be made against the biometric identifier(s) provided by the key owner(s). Upon verifying that the biometric identifier offered by the key owner(s) matches the trusted biometric key, the biometric lock may unlock, thereby allowing the key owners to open the front door of the server rack to reveal the HSM and safe.

Once the front server door is opened, at step 520, key custodian A and key custodian B may attempt to open the safe by unlocking the biometric lock on the outer safe door. This biometric lock may be the same or similar to the biometric lock on server rack door. This biometric lock may also be entirely distinct depending on security requirements. For example, utilizing different biometric locks may improve security by reducing the risk of hacking the biometric locks. The locks also may be different if they require different functionalities. For instance, if the lock on the server rack door does not require dual authentication, then it may not be the same lock as that used on the outer door of the safe. At step 520, key custodian A and key custodian B may each provide one or more biometric identifiers to the biometric lock of the safe door. In some embodiments, the biometric lock may require key custodian A and key custodian B to provide biometric identifiers within a specified time of each other. For instance, the biometric lock may require access attempts by key custodian A and key custodian B within a minute of each other, or some other defined time. This avoids the scenario where both key custodian are not present at the same time when attempting to access the safe. The biometric lock on the outer door of the safe may require a preset number of biometric identifiers. In other embodiments, the number of required biometric identifiers may be randomly generated by the lock. In other embodiments, the type of biometric identifiers may be fixed, and in other embodiments, the type(s) may be randomly chosen by the lock. The lock may require a certain order of biometric identifiers. In a simplistic example, the lock may only require a single biometric identifier which may be specified, such as a fingerprint. Other rules may be implemented for authentication.

Upon successful authentication of key custodian A and key custodian B, the safe may unlock and the outside safe door may be opened. Inside the safe, there may be two or more compartments. The first compartment, compartment A, may store one or more keys belonging to, or under the custody and control of, key custodian A. Each of these one or more keys may fit one physical lock on each of one or more HSMs on the server rack. For example, each key within compartment A may fit a lock on the left side of the face of each HSM on the server rack. Similarly, the second compartment, compartment B, may store one or more keys belonging to, or under the custody and control of, key custodian B. Each of these one or more keys may fit one physical lock on each of one or more HSMs on the server rack. For example, each key within compartment B may fit a lock on the right side of the face of each HSM on the server rack. Compartment A and compartment B may each be secured by a biometric lock that is independent from the biometric lock on the outer door of the safe. Compartment A may only be unlocked by key custodian A and compartment B may only be unlocked by key custodian B.

At step 530, key custodian A may provide biometric identification to the biometric lock of compartment A. If the biometric lock of compartment A is connected to the HSM, the HSM may provide an encrypted biometric key to the biometric lock of compartment A. This process may be similar to that discussed with respect to the biometric lock on server rack door and the biometric lock on the outer door of the safe. Authentication and unlocking of the biometric lock of compartment A may be similar to the description provided with respect to the biometric lock on the server rack door. Once the provided biometric identification is authenticated, compartment A may become accessible to key custodian A.

At step 540, key custodian A may retrieve a physical key corresponding to the left side lock of the target HSM.

At step 550, key custodian B may provide biometric identification to the biometric lock of compartment B. If the biometric lock of compartment B is connected to the HSM, the HSM may provide an encrypted biometric key to the biometric lock of compartment B. This process may be similar to that discussed with respect to the biometric lock on server rack door and the biometric lock on the outer door of the safe. Authentication and unlocking of the biometric lock of compartment B may be similar to the description provided with respect to the biometric lock on the server rack door. Once the provided biometric identification is authenticated, compartment B may become accessible to key custodian B. At step 560, key custodian B may retrieve a physical key corresponding to the right side lock of the target HSM.

At step 570, key custodian A may apply the key retrieved at step 540 to the left-side physical lock of the target HSM. This may include inserting the key into the lock and turning the key to an unlock position. Also at step 570, key custodian B may apply the key retrieved at step 560 to the right-side physical lock of the target HSM. This may include inserting the key into the lock and turning the key to an unlock position. Once both locks on the target HSM have been unlocked, the HSM may be removed from the server rack.

Figure 6:
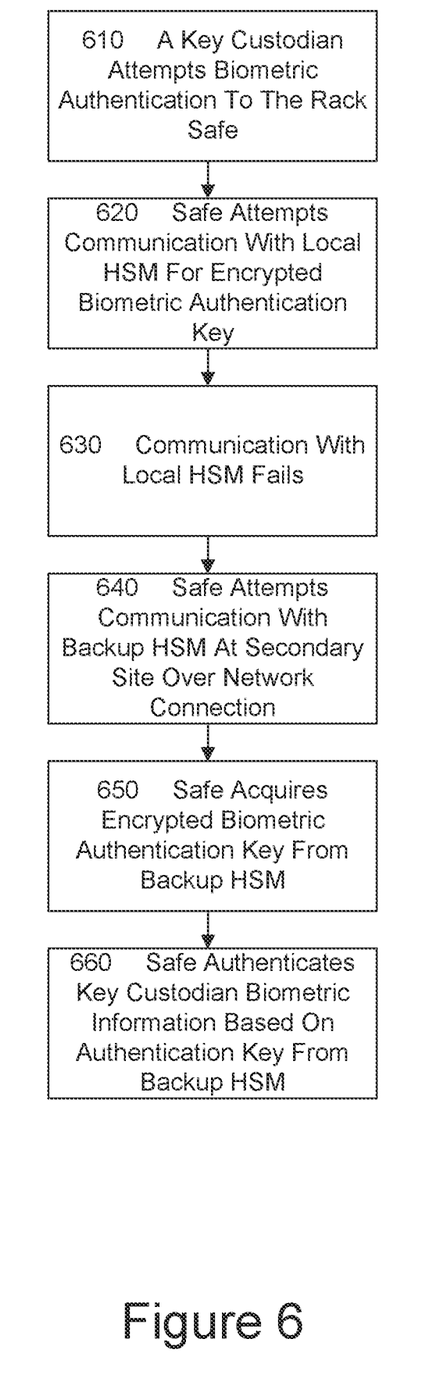
FIG. 6 is a flow diagram illustrating a method of backing up the integration of a physical safe with a server rack containing hardware security modules according to an embodiment of the invention.

FIG. 6 illustrates an exemplary method for failover of a system incorporating a server rack with integrated physical safe and one or more hardware security modules according to an embodiment of the invention.

At step 610, a key custodian attempts to authenticate biometrically to one of the biometric locks connected to a HSM in the disclosed system. This may include one or more of the biometric lock on the server rack door, the biometric lock on the outer safe door, or either of the biometric locks on the compartment A or compartment B doors.

As a result of the attempted biometric authentication of step 610, the relevant biometric lock, at step 620, attempts to communicate with the HSM that maintains the trusted biometric key(s). Specifically, the biometric lock requests a copy of the encrypted biometric authentication key from the HSM.

At step 630, the biometric lock fails to communicate with the HSM. For example, the HSM may fail to send the requested encrypted biometric authentication key, may send a corrupted file, may send the wrong file, may fail to send any response, etc. This communication failure may be the result of a damaged or broken HSM. In this embodiment, the HSM would need to be physically removed from the server rack for repair or replacement, but the physical keys for unlocking the HSM are inside the safe which requires biometric authentication to open and the authentication key is stored on the damaged or broken HSM.

To ensure continued function of the disclosed system, at step 640, the biometric lock of the safe (or other biometric lock as designed) will attempt communication with a secondary HSM at a secondary site over a network connection. The secondary HSM may be part of another server rack with integrated HSM and safe. This secondary system may be entirely redundant to the primary system. It also may be different and only share biometric authentication key(s) as a failover precaution. The backing up of biometric authentication keys may also occur in the reverse order. For example, the biometric authentication key(s) for the secondary system may also be stored on the HSM of the first system and may provide failover protection for the secondary system. The system may be scalable and may employ any number of additional systems, redundant or distinct.

At step 650, the safe may acquire the requested biometric authentication key(s) from the backup HSM. The safe may acquire the requested biometric authentication key(s) over a network connection. With the backup HSM.

At step 660, the biometric lock of the safe (or other biometric lock as the case may be) authenticates the biometric identifier provided at step 610 by comparing that biometric identifier with the biometric authentication key(s) from the backup HSM.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

I claim:

1. A system for integrating a physical safe with one or more hardware security modules ("HSMs") on a server rack, comprising:
    the server rack including a first side mounting rail, a second side mounting rail, and a locking front door with a biometric lock;
    one or more HSMs mounted and physically locked to the first side mounting rail through a first keyed lock and the second side mounting rail through a second keyed lock; and
    a safe comprising:
        a plurality of mounting ears, wherein the plurality of mounting ears fit entirely within the server rack when the server rack locking front door is closed;
        a biometric lock on a safe front door configured to unlock responsive to a biometric authentication from each of a key custodian A and a key custodian B; and
        a plurality of internal compartments, comprising:
            a compartment A containing physical keys for the first side lock of the one or more HSMs secured by a biometric lock that unlocks responsive to biometric authentication by key custodian A; and
            a compartment B containing physical keys for the second side lock of the one or more HSMs secured by a biometric lock that only unlocks responsive to biometric authentication by key custodian B.

2. The system of claim 1, wherein the biometrics for the biometric lock on the front rack door, the biometric lock on the safe front door and the biometric lock on the compartment A and compartment B comprise one or more of fingerprint, retinal scan, voice print, and facial recognition.

3. The system of claim 1, wherein biometric authentication is verified by a digital biometric key for each of key custodian A and key custodian B, and the digital biometric keys for key custodian A and key custodian B are encrypted.

4. The system of claim 3, wherein the encrypted digital biometric key is stored on one or more of the rack-mounted HSMs.

5. The system of claim 4, wherein the biometric lock on the front rack door, the biometric lock on the safe front door and the biometric lock on compartment A and compartment B are in digital communication with at least one of the one or more HSMs via a hardwired direct connection.

6. The system of claim 4, wherein the biometric lock on the front rack door, the biometric lock on the safe front door and the biometric lock on compartment A and compartment B are in digital communication with at least one of the one or more HSMs via a network connection.

7. The system of claim 4, wherein the biometric lock on the front rack door, the biometric lock on the safe front door and the biometric lock on compartment A and compartment B are network connected to one or more redundant HSMs in a separate rack system, and wherein the biometric locks are configured to acquire the encrypted digital biometric key from the one or more redundant HSMs over the network connection upon failure of the one or more HSMs.

8. The system of claim 1, wherein compartment A and compartment B each store one of the two physical keys required to unlock each of the one or more HSMs from the rack.

9. The system of claim 1, wherein the biometric authentication of key custodian A and key custodian B must occur within a predefined timeframe.

10. The system of claim 1, wherein the safe is designed to fit within the rack and to meet weight limitations for the rack and a floor of a room where the rack is installed.

11. A method for using an integrated physical safe with one or more hardware security modules ("HSMs") on a server rack, comprising:
    receiving, at a biometric lock on a front door of the server rack, a biometric rack access attempt from one of a key custodian A and a key custodian B;
    authenticating the biometric rack access attempt by comparing the biometric rack access attempt with a digital biometric key for key custodian A and key custodian B;
    unlocking, as a result of the authentication, the biometric lock on the front door of the server rack to reveal one or more rack-mounted HSMs physically locked to the rack, and a rack mounted safe with a biometric lock on the front door;
    receiving, by the safe, biometric safe access attempts from each of the key custodian A and the key custodian B;
    authenticating the safe biometric access attempts of both the key custodian A and the key custodian B by comparing the biometric safe access attempt with the digital biometric key for key custodian A and key custodian B;
    unlocking, as a result of the safe authentication, the biometric lock on the front door of the safe to reveal at least two internal compartments, a compartment A and a compartment B, compartment A having a biometric lock and containing at least one physical key and compartment B having a biometric lock and containing at least one physical key;
    receiving, by the biometric lock of compartment A, a biometric compartment A access attempt by the key custodian A;
    authenticating the biometric compartment A access attempt by comparing the attempt with the digital biometric key for key custodian A and key custodian B;
    unlocking, as a result of the biometric compartment A authentication, the biometric lock on compartment A to provide access to the at least one physical key within compartment A;
    receiving, by the biometric lock of compartment B, a biometric compartment B access attempt by the key custodian B;
    authenticating the biometric compartment B access attempt by comparing the attempt with the digital biometric key for key custodian A and key custodian B;
    unlocking, as a result of the biometric compartment B authentication, the biometric lock on compartment B to provide access to the at least one physical key within compartment B; and
    unlocking with one of the at least one physical key from compartment A and one of the at least one physical key from compartment B, one of the one or more rack-mounted HSMs from the rack.

12. The method of claim 11, wherein the biometrics for the biometric rack access attempt, the biometric safe access attempt, the biometric compartment A access attempt, and the biometric compartment B access attempt comprise one or more of fingerprint, retinal scan, voice print, and facial recognition.

13. The method of claim 11, wherein the digital biometric key for key custodian A and key custodian B is encrypted.

14. The method of claim 13, wherein the encrypted digital biometric key is stored on one or more of the rack-mounted HSMs.

15. The method of claim 14, wherein the biometric lock on the front rack door, the biometric lock on the safe front door and the biometric lock on compartment A and compartment B are in digital communication with at least one of the one or more HSMs via a hardwired direct connection.

16. The method of claim 14, wherein the biometric lock on the front rack door, the biometric lock on the safe front door and the biometric lock on compartment A and compartment B are in digital communication with at least one of the one or more HSMs via a network connection.

17. The method of claim 14, wherein the biometric lock on the front rack door, the biometric lock on the safe front door and the biometric lock on compartment A and compartment B are network connected to one or more redundant HSMs in a separate rack system, and wherein the biometric locks acquire the encrypted digital biometric key from the one or more redundant HSMs over the network connection upon failure of the one or more HSMs.

18. The method of claim 11, wherein compartment A and compartment B each store one of the two physical keys required to unlock each of the one or more HSMs from the rack.

19. The method of claim 11, wherein the biometric safe access attempts from key custodian A and key custodian B must occur within a predefined timeframe.

20. A method for using an integrated physical safe with one or more hardware security modules ("HSMs") on a data center rack, comprising:
receiving, at a biometric lock on an outer door of a safe mounted in the data center rack at a first location, a biometric authentication attempt from a key custodian;
sending, as a result of the received biometric authentication attempt, a request for an encrypted biometric authentication key to a HSM mounted in the data center rack;
receiving a communication failure with the HSM;
sending, as a result of the communication failure with the HSM, a request, over a network, for the encrypted biometric authentication key to a secondary HSM at a secondary location;
receiving the encrypted biometric authentication key from the secondary HSM; and
authenticating the biometric authentication attempt by comparing the biometric authentication attempt with the encrypted biometric authentication key from the secondary HSM.

\* \* \* \* \*